(12) United States Patent
Shindoh

(10) Patent No.: US 8,079,405 B2
(45) Date of Patent: Dec. 20, 2011

(54) AIR CONDITIONING APPARATUS FOR VEHICLE

(75) Inventor: Tomohide Shindoh, Kariya (JP)

(73) Assignee: Denso Corporation, Kariya (JP)

( * ) Notice: Subject to any disclaimer, the term of this patent is extended or adjusted under 35 U.S.C. 154(b) by 832 days.

(21) Appl. No.: 12/154,875

(22) Filed: May 28, 2008

(65) Prior Publication Data
US 2008/0295992 A1   Dec. 4, 2008

(30) Foreign Application Priority Data

May 30, 2007   (JP) ................................ 2007-143575

(51) Int. Cl.
*B60H 3/00*  (2006.01)
*B60H 1/00*  (2006.01)
*F25B 13/00*  (2006.01)

(52) U.S. Cl. ................ 165/42; 62/160; 62/244; 165/41; 165/202

(58) Field of Classification Search ..................... 62/244, 62/160, 235; 165/202, 41–42
See application file for complete search history.

(56) References Cited

U.S. PATENT DOCUMENTS

| | | | | |
|---|---|---|---|---|
| 5,735,338 A | * | 4/1998 | Chevroulet et al. | 165/42 |
| 5,836,380 A | * | 11/1998 | Takesita et al. | 165/43 |
| 5,950,711 A | * | 9/1999 | Bendell | 165/42 |
| 6,959,561 B2 | | 11/2005 | Kawada et al. | |
| 2004/0089006 A1 | * | 5/2004 | Kamiya et al. | 62/244 |

FOREIGN PATENT DOCUMENTS

| | | |
|---|---|---|
| JP | 08-282245 | 10/1996 |
| JP | 09-132024 | 5/1997 |
| JP | 2003-002030 | 1/2003 |
| JP | 2003-136936 | 5/2003 |

OTHER PUBLICATIONS

Office action dated Dec. 24, 2008 in Japanese Application No. 2007-143575.

* cited by examiner

*Primary Examiner* — Frantz Jules
*Assistant Examiner* — Timothy K Trieu
(74) *Attorney, Agent, or Firm* — Harness, Dickey & Pierce, PLC (57) ABSTRACT

An air conditioning apparatus has a blower, a unit case, a cooling heat exchanger and a heating heat exchanger. The heat exchangers are disposed in the unit case such that ends thereof are adjacent to the blower. The unit case has a side opening on its side wall and a tubular part between the end of the heating heat exchanger and a casing of the blower. The tubular part has a communication portion for allowing communication between a hollow space provided therein and a space downstream of the second heat exchanger. The unit case has a passage opening at an end of the tubular part and adjacent to the side opening for allowing the air introduced in the hollow space to flow out from the hollow space. Further, a door is provided in the unit case to open and close the side opening and the communication portion simultaneously.

5 Claims, 4 Drawing Sheets

FIG. 4B

AIR CONDITIONING APPARATUS FOR VEHICLE

CROSS REFERENCE TO RELATED APPLICATION

This application is based on Japanese Patent Application No. 2007-143575 filed on May 30, 2007, the disclosure of which is incorporated herein by reference.

FIELD OF THE INVENTION

The present invention relates to an air conditioning apparatus for a vehicle.

BACKGROUND OF THE INVENTION

With regard to an air conditioning apparatus for a vehicle, in general, a blower, a cooling heat exchanger and a heating heat exchanger are arranged closed to each other in an air conditioning case, so as to reduce an overall size of the apparatus and pressure loss of air flowing in the air conditioning case.

For example, with regard to a vehicular air conditioning unit described in U.S. Pat. No. 5,950,711, a cooling heat exchanger is inclined such that an air introducing surface of a core faces an upper space and a heating heat exchanger is inclined such that an air introduction surface of a core faces a lower space, in an air conditioning case. Further, an end of the cooling heat exchanger is adjacent to an end of the heating heat exchanger, at a position close to a casing of a blower. Namely, the cooling heat exchanger and the heating heat exchanger are arranged in a reversed V-shape at the position close to the blower, so as to reduce the size of the air conditioning unit with respect to an up and down direction.

The air conditioning case has foot openings on right and left side walls with respect to a vehicle width direction. The foot openings are opened and closed by foot doors that are provided to be movable along the side walls. In this case, an air passage and the like are provided in a track of rotation of the foot doors. Because a space provided between the foot doors is used for the air passage, the size of the air conditioning unit with respect to a vehicle front and rear direction is reduced.

However, in an air conditioning case having foot openings simply on side walls, because a flow direction of air is largely changed while the air flowing into the foot openings, it is difficult to maintain the volume of air. Otherwise, it will be necessary to enlarge the foot openings. In a case where the foot openings are enlarged, operation ranges of the foot doors need to be increased, resulting in the increase in the overall size of an air conditioning apparatus.

SUMMARY OF THE INVENTION

The present invention is made in view of the foregoing matter, and it is an object of the present invention to provide an air conditioning apparatus for a vehicle, having a structure that is capable of increasing the volume of air blown from an opening of a side wall of a unit case without increasing an overall size of the air conditioning apparatus.

According to an aspect of the present invention, air conditioning apparatus for a vehicle includes a blower, a unit case, a first heat exchanger, a second heat exchanger, and a door. The blower includes a fan casing and a fan housed in the fan casing. The unit case is in communication with the fan casing. The unit case has a side wall. The first heat exchanger is disposed in the unit case for cooling air generated by the fan. The second heat exchanger is disposed in the unit case downstream of the first heat exchanger with respect to a flow of air for heating air that has passed through the first heat exchanger. A side opening is provided in the side wall of the unit case at a position downstream of the second heat exchanger with respect to the flow of air. The door is disposed in the unit case for opening and closing the side opening. The first heat exchanger and the second heat exchanger are disposed such that ends thereof are adjacent to the fan casing, and a spacing therebetween increases as a function of distance from the fan casing. The unit case includes a tubular part providing a hollow space therein and defining an axis parallel to the axial direction of the fan. The tubular part is disposed between the fan casing and the end of the second heat exchanger. The tubular part has a communication portion configured to allow communication between a space provided downstream of the second heat exchanger and the hollow space provided therein. The unit case further has a passage opening at a position corresponding to an end of the tubular part with respect to the axial direction for allowing air introduced in the hollow space through the communication portion to flow out from the hollow space. The passage opening is located adjacent to the side opening. The door is configured to open and close the communication portion and the side opening simultaneously.

In the above construction, the tubular part is disposed between the fan casing and the end of the second heat exchanger, the hollow space of the tubular part is in communication with the space provided downstream of the second heat exchanger through the communication portion. Thus, in addition to the air blown from the side opening, the air passing through the communication portion can be blown from the passage opening through the hollow space. As such, the volume of air blown from the side opening and the passage opening is increased. Since the door is configured such that the side opening and the communication portion are opened and closed simultaneously to each other. Therefore, it is less likely that the overall size of the air conditioning apparatus will be increased.

Further, since the tubular part is disposed between the fan casing and the end of the second heat exchanger, it is less likely that the air inside of the fan casing will be affected by heat of the second heat exchanger. Also, because the air inside of the hollow space is blown out from the passage opening, air conditioning efficiency improves.

According to a second aspect of the present invention, an air conditioning apparatus includes a fan for generating air, a first heat exchanger for cooling air generated by the fan, a second heat exchanger for heating air passing through the first heat exchanger, a case, and a door. The first heat exchanger is disposed in the case downstream of the fan with respect to a flow of air. The second heat exchanger is disposed in the case downstream of the first heat exchanger. The case includes a first side wall, a second side wall opposed to the first side wall, and a tubular part extending between the first side wall and the second side wall. The tubular part provides a hollow space therein and has a communication portion that allows communication between a space defined downstream of the second heat exchanger in the case and the hollow space. Each of the first side wall and the second side wall has a side opening at a position downstream of the second heat exchanger and a passage opening at an end of the tubular part and adjacent to the side opening. The door is disposed in the case for opening and closing the side openings and the communication portion simultaneously. The door includes a rotation shaft that is parallel to an axis of the tubular part, first door portions integrated with the rotation shaft and movable along the first and second side walls, and a second door portion perpendicular to the first door portions and movable along a peripheral wall of the tubular part. A first duct is coupled to the side opening and the passage opening of the first side wall. A second duct is coupled to the side opening and the passage opening of the second side wall.

The communication portion is provided by the tubular part, and the communication portion is opened and closed by the door, simultaneously with the opening and closing of the side opening. The air passing through the side opening and the passage opening are conducted into each of the first and second duct. Accordingly, the volume of air conducted in each duct is increased, without increasing an overall size of the air conditioning apparatus.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

First Embodiment

Figure 1:
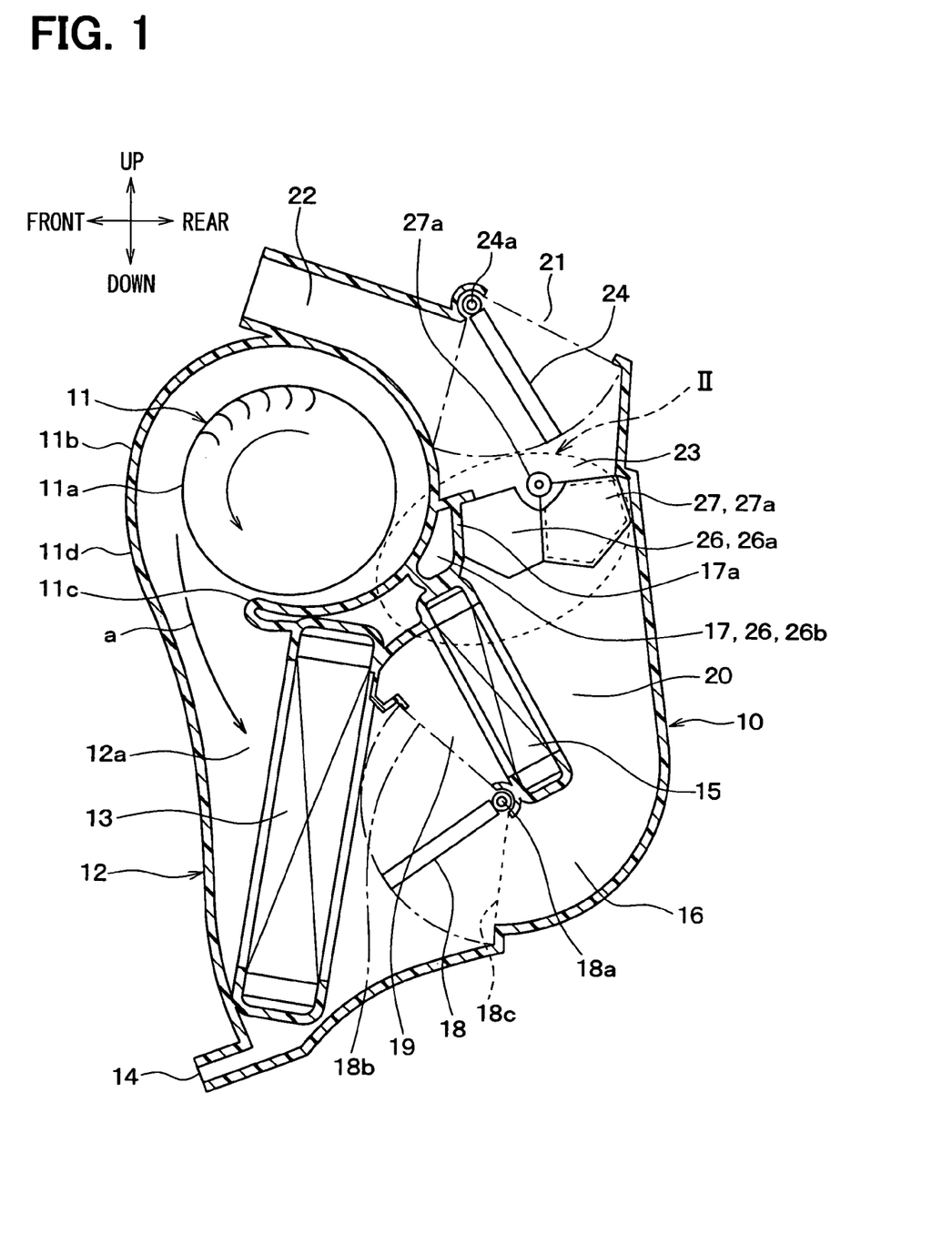
FIG. 1 is a cross-sectional view of an interior unit of an air conditioning apparatus according to a first embodiment of the present invention.

A first embodiment of the present invention will be described with reference to FIGS. 1 to 3C. Referring to FIG. 1, an interior unit 10 of a vehicular air conditioning apparatus is mounted in a space provided inside of an instrument panel that is located at a front part of a passenger compartment of a vehicle, and at a substantially middle position with respect to a vehicle right and left direction. In FIG. 1, an up and down arrow and a front and rear arrow denote respective directions when the interior unit 10 is mounted in a vehicle. Also, a direction perpendicular to a paper surface of FIG. 1 corresponds to the right and left direction of the vehicle, which is also referred to as a vehicle width direction.

The interior unit 10 has a blower 11 at a front upper position. The blower 11 includes a fan 11a, a motor (not shown) for driving the fan 11a, and a scroll casing 11b. For example, the fan 11a is a centrifugal multi blade fan, such as a sirocco fan. The scroll casing 11b houses the fan 11a and forms a scroll passage therein. The fan 11a is disposed such that its axis extends in the vehicle right and left direction, for example. The scroll casing 1b has a nose portion 11c, which is a base point of the scroll passage, under the fan 11a. An end 11d of the scroll passage is located in front of the nose portion 11c across a predetermined distance. The end 11d of the scroll passage is in communication with a space 12a formed at a front portion of a unit case 12. Namely, the scroll casing 11b provides a fan casing for rotatably housing the fan 11a and conducting air blown by the fan 11a into the unit case 12.

An inside/outside air switching device (not shown) is provided on a suction side of the fan 11a. The fan 11a draws air, such as inside air and outside air, from the inside/outside air switching device and blows the air into the scroll passage. Thus, the air is conducted into the space 12a of the unit case 12 in a substantially downward direction as shown by an arrow a in FIG. 1.

The unit case 12 forms an air passage through which the air blown by the fan 11a flows. For example, the unit case 12 is constructed of plural resinous case members. The case members are integrated with each other through fastening members such as screws and metal spring clips. Although not illustrated in FIG. 1, the unit case 12 has side walls 12b on its right and left ends with respect to the vehicle right and left direction.

The unit case 12 houses an evaporator 13 as a cooling heat exchanger under the fan 11a. The evaporator 13 is arranged in a generally vertical position such that heat exchanging surfaces of a core part, such as, front and rear surfaces of the core part extend in the generally up and down direction. Further, the evaporator 13 is inclined such that its upper end is slightly located more to a rear side of the vehicle than its lower end. The air blown by the fan 11a fully passes through the core part of the evaporator 13 in a vehicle rearward direction.

The core part of the evaporator 13 has a general core structure in which flat tubes and corrugated fins for increasing heat exchanging surfaces of air are alternately stacked and joined together. The flat tubes form refrigerant passages therein through which a low pressure refrigerant, which has been decompressed by decompression device (not shown) of a refrigerant cycle, flows. The evaporator 13 performs heat exchange between the low pressure refrigerant and the air blown by the fan 11a. The low pressure refrigerant is evaporated by heat of the air while passing through the tubes, and thus the air is cooled.

The unit case 12 has a drain port 14 under the evaporator 13 for draining condensation of the evaporator 13. For example, the drain port 14 is located at a lowermost position within the unit case 12.

A heater core 15 as a heating heat exchanger is disposed in the unit case 12, at a position downstream of the evaporator 13, such as, on a rear side of the evaporator 13. The heater core 15 is inclined in a frontward direction such that its upper end is adjacent to the upper end of the evaporator 13 and a spacing provided between the heater core 15 and the rear surface of the evaporator 13 increases as a function of distance from the upper end in a downward direction.

That is, the evaporator 13 and the heater core 15 are arranged to form a reversed V-shape when viewed in the vehicle right and left direction. In addition, the upper end of the evaporator 13 is located adjacent to the blower 11, and the upper end of the heater core 15 is located under the blower 11 across a passage portion 17 of the unit case 12.

Since the evaporator 13 and the heater core 15 are arranged in the reversed V-shape at a location adjacent to the blower 11, a size of the interior unit 10 with respect to the up and down direction is reduced. A dimension (length) of the heater core 15 with respect to the up and down direction is smaller than that of the evaporator 13. Therefore, a cooled air passage 16 is provided between the lower end of the heater core 15 and a bottom wall of the unit case 12. The cooled air passage 16 allows cooled air generated by the evaporator 13 to flow while bypassing the heater core 15.

The passage portion 17 is constructed of a portion of the unit case 12, which supports the upper end of the heater core 15, a portion of a wall of the scroll casing 11b, and a passage wall 17a that connects the portion of the unit case 12 and the portion of the peripheral wall of the scroll casing 11b. Thus, the passage portion 17 has a substantially tubular shape defining a hollow space therein and having a longitudinal axis in the vehicle right and left direction. That is, the passage portion 17 forms a tubular part, and provides a passage space, that is, a hollow space therein. For example, the longitudinal axis of the passage portion 17 is parallel to the axis of the fan 11a.

The passage portion 17 is provided to increase an opening area of a foot opening 26, which will be described later in detail, as much as possible. The passage portion 17 is integrally formed into the unit case 12.

The heater core 15 has a core part for performing heat exchange. The core part of the heater core 15 has a general heat exchanging core structure in which flat tubes and corrugated fins for increasing heat exchange surfaces of the air are alternately stacked in the vehicle right and left direction and joined to each other. The flat tubes defines heat medium passages therein through which a heat medium, such as a hot water from an engine, flows. The heater core 15 heats the air, which has passed through the evaporator 13, using heat of the heat medium flowing through the flat tubes of the core part.

An air mix door 18 is provided between the evaporator 13 and the heater core 15. The air mix door 18 is supported to be rotatable about a rotation shaft 18a. For example, the air mix door 18 is a plate door, and the rotation shaft 18a is integrated with an end of a door body.

The rotation shaft 18a is located on a front side of the lower end of the heater core, with respect to the vehicle front and rear direction. The rotation shaft 18a extends in the vehicle right and left direction, and ends of the rotation shaft 8a are rotatably supported in bearing holes that are formed in the side walls 12b of the unit case 12.

One of the ends of the rotation shaft 18a projects outside of the unit case 12 and is coupled to a temperature adjustment operation device (not shown) so that the air mix door 18 is rotated by an operation force from the temperature adjustment operation device. For example, the temperature adjustment operation device is an actuator device including a servomotor.

The air mix door 18 is movable between a maximum cooling position 18b shown by a chain dashed line in FIG. 1 and a maximum heating position 18c shown by a dashed line in FIG. 1. When the air mix door 18 is at the maximum cooling position 18b, the cooled air passage 16 is fully open and a heated air passage 19 for conducting the cooled air to the heater core 15 to be heated by the heater core 15 is fully closed. On the other hand, when the air mix door 18 is at the maximum heating position 18c, the heated air passage 19 is fully open and the cooled air passage 16 is fully closed.

A ratio of the volume of the air passing through the heated air passage 19 to the volume of the air passing through the cooled air passage 19 is adjusted in accordance with the position of the air mix door 18. A temperature of air to be introduced into the passenger compartment is controlled by adjusting the ratio of the heated air to the cooled air. Thus, the air mix door 18 serves as temperature control member for controlling the temperature of air to be blown into the passenger compartment.

In the unit case 12, an air mix space 20 is provided at a position downstream of the heater core 15, such as, on the rear side of the heater core 15. The heated air passing through the heated air passage 19 and the cooled air passing through the cooled air passage 16 merge together in the air mix space 20. Thus, the air mix space 20 serves as an air mixing portion.

The unit case 12 has openings for conducting the air passing through the air mix space 20 toward respective positions of the passenger compartment. For example, the unit case 12 has a face opening 21, a defroster opening 22 and the foot openings 26.

The face opening 21 is located at a rear portion of an upper wall part of the unit case 12. The defroster opening 22 is located on a front side of the face opening 21 in the upper wall part of the unit case 12. The air mix space 20 is in communication with the face opening 21 and the defroster opening 22 through a face/defroster passage 23. The face opening 21 and the defroster opening 22 are opened and closed by a face door 24. For example, the face door 24 is a plate door that is rotatable about a rotation shaft 24a.

A face duct (not shown) is coupled to the face opening 21 for conducting the air (e.g., mainly cool air) passing through the face opening 21 into the passenger compartment. The face duct has a face air-blowing outlet at an end. The air passing through the face opening 21 is blown toward an upper area of the passenger compartment, such as a passenger's upper body area, from the face air-blowing outlet.

A defroster duct (not shown) is coupled to the defroster opening 22 for conducting the air (e.g., mainly warm air) passing through the defroster opening 22 toward a windshield of the vehicle. The defroster duct has a defroster air-blowing outlet at an end. Thus, the air passing through the defroster opening 22 is blown toward an inner surface of the windshield from the defroster air-blowing outlet.

Figure 2A:
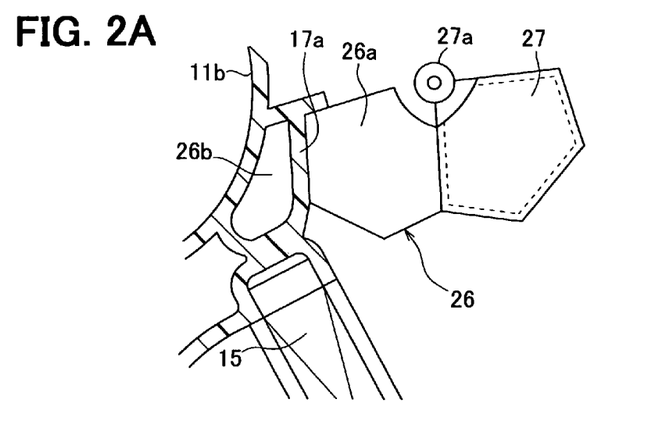
FIG. 2A is an enlarged view of a section 11 of the interior unit shown in FIG. 1 according to the first embodiment.
Figure 2B:
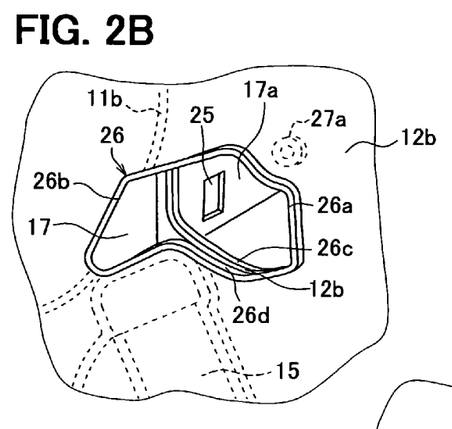
FIG. 2B is a schematic perspective view of a foot opening of the interior unit according to the first embodiment.
Figure 2C:
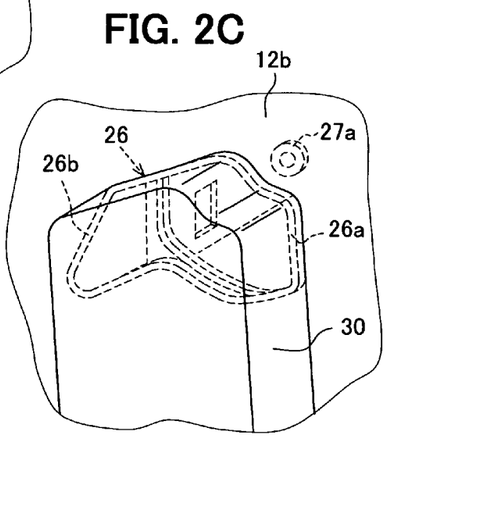
FIG. 2C is a schematic side view of a foot duct coupled to the foot opening according to the first embodiment.

Referring to FIGS. 2A to 2C, a structure around the foot openings 26 will be described. FIG. 2A shows a structure around the foot opening 26, and FIG. 2B shows a perspective view of the foot opening 26 when viewed from a generally rear side of the vehicle. The foot openings 26 are formed on the right and left side walls 12b of the unit case 12. Because the right and left foot openings 26 have the similar structure, a description will be made mainly with regard to the left foot opening 26, as an example.

The foot opening 26 is formed on the side wall 12b of the unit case 12, at a location downstream of the heater core 15, such as above the heater core 15. The foot opening 26 is constructed of a side opening 26a and a passage opening 26b.

The side opening 26a and the passage opening 26b are adjacent to each other through the passage wall 17a. As shown in FIG. 2C, a single foot duct 30 is coupled to the side opening 26a and the passage opening 26b on each side of the unit case 12. The foot duct 30 has a foot air-blowing outlet at an end. The air (e.g., mainly warm air) passing through the side opening 26a and the passage opening 26b is introduced in the foot duct 30, and is blown from the foot air-blowing outlet toward a lower area of the passenger compartment, such as a passenger's foot area.

The foot air-blowing outlet is located lower than the side opening 26a and the passage opening 26b and adjacent to the lower area of the passenger compartment, such as the passenger foot area. The foot duct is arranged to extend downwardly from the side opening 26a and the passage opening 26b. As such, the foot air-blowing outlet and the foot opening 26 are connected to each other with a short distance. That is, a distance between the foot opening 26 and the foot air-blowing outlet is reduced, and hence the length of the foot duct 30 is reduced.

The side opening 26a and the passage opening 26b are provided for conducting air (hereinafter, conditioned air) flowing through the downstream of the heater core 15 into the foot duct 30. The side opening 26a is formed on the side wall 12b of the unit case 12. The side opening 26a is located above the heater core 15 and adjacent to the passage wall 17a of the passage portion 17. The side opening 26a has a substantially fan shape, for example.

The passage portion 17 extends between the side walls 12b. The passage opening 26b is defined at an end of the passage portion 17 in the vehicle right and left direction. The passage opening 26b and the side opening 26a are defined on the same surface. For example, the passage opening 26b and the side opening 26a may be defined on the same plane.

The passage wall 17a, which defines a peripheral wall of the passage portion 17, faces the space provided downstream of the heater core 15. The passage wall 17a have a communication portion 25 for allowing communication between the space provided downstream of the heater core 15 and the passage space inside of the passage portion 17. The communication portion 25 provides two openings adjacent to ends of the passage wall 17a with respect to the vehicle right and left direction. For example, each of the openings of the communication portion 25 has a rectangular shape. Thus, the conditioned air downstream of the heater core 15 is introduced in the passage space of the passage portion 17 through the communication portion 25, and further passes through the passage opening 26.

The unit case 12 has an inner projection 26c on the perimeter of the side opening 26a. The inner projection 26c projects inside of the unit case 12 from the side wall 12b. The inner projection 26c has a loop shape along the fan-shaped side opening 26a. The inner projection 26c serves as a sealing portion to seal the side opening 26a in a condition where a foot door 27 is at a fully close position.

Further, the unit case 12 has an outer projection 26d on the perimeter of the foot opening 26, which is provided by the side opening 26a and the passage opening 26b. The outer projection 26d projects from the side wall 12b to the outside of the unit case 12. The outer projection 26d is provided for coupling the foot duct 30 to the passage opening 26b and the side opening 26a.

Since the foot opening 26 is provided by the side opening 26a and the passage opening 26b, the size of the foot opening 26 is increased, as compared with a case where the foot opening 26 is provided only by the side opening 26a.

Figure 3A:
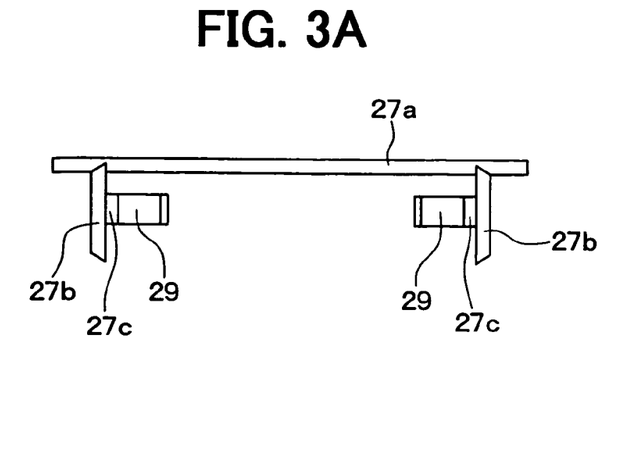
FIG. 3A is a side view of a foot door of the interior unit according to the first embodiment.
Figure 3B:
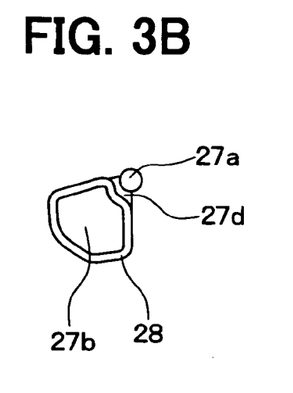
FIG. 3B is an end view of the foot door according to the first embodiment.
Figure 3C:
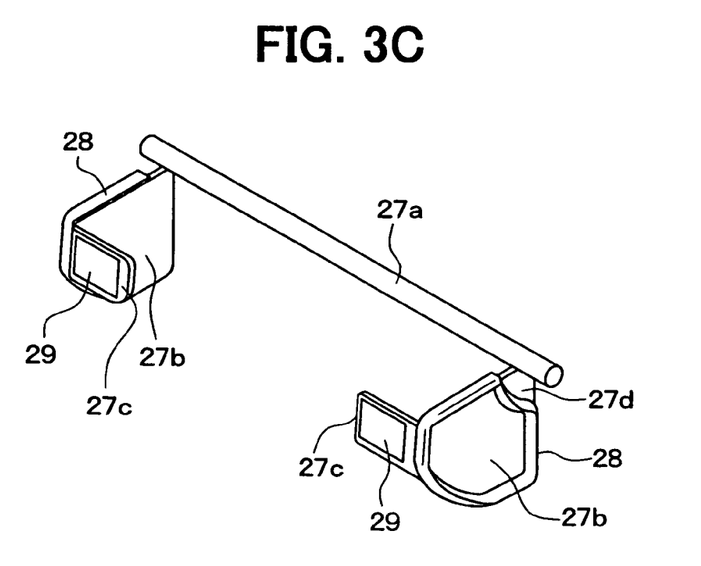
FIG. 3C is a perspective view of the foot door according to the first embodiment.

The foot openings 26 are opened and closed by the foot door 27 shown in FIGS. 3A to 3C. The foot door 27 has a rotation shaft 27a and plural door portions, such as first door portions 27b and second door portions 27c as a door body, for opening and closing the foot openings 26. The plural door portions are rotatably supported by the rotation shaft 27a. The rotation shaft 27a is disposed at a position corresponding to the pivot of the substantially fan shape of the side opening 26a. The rotation shaft 27a is parallel to the axis of the fan 11a, for example. The rotation shaft 27a is perpendicular to the side walls 12b of the unit case 12, for example.

Each of the first door portions 27b has a substantially fan shape for opening and closing the side opening 26a. Each of the second door portions 27c is disposed at a peripheral end of the first door portion 27b for opening and closing the openings of the communication portion 25.

For example, the first door portion 27b is movable along an inner surface of the side wall 12b. Thus, the side opening 26a is opened and closed by the first door portion 27b. The second door portion 27c is movable with the first door portion 27b. Thus, the openings of the communication portion 25 are opened and closed by the second door portions 27c when the side opening 26a is opened and closed by the first door portion 27b.

The first door portion 27b is a resinous plate member having a substantially fan shape, and provides a flat door surface. The first door portion 27b is integrated with the rotation shaft 27a through a connecting portion 27d that is disposed at the pivot of the fan shape of the first door portion 27b. For example, the first door portion 27b is perpendicular to the rotation shaft 27a. The first door portion 27b is disposed such that the surface of the first door portion 27b, which is opposed to the inner surface of the side wall 12b, is movable along a projected end of the inner projection 26c. Further, a first sealing member 28 is fixed along the peripheral end of the first door portion 27b, such as by gluing, adhering or the like. The first sealing member 28 projects toward the inner projection 26c.

The second door portion 27c serves as a sub-door that is movable with the first door portion 27b. The second door portion 27c is located at an end of the first door portion 27b on a side generally opposite to the pivot of the fan shape of the first door portion 27b. The second door portion 27c is disposed to extend inwardly from the first door portion 27b. For example, the second door portion 27c extends parallel to the rotation shaft 27a. The second door portion 27c has a rectangular plate shape.

The second door portion 27c has a second sealing member (portion) 29 on a surface that is to be opposed to the communication portion 25. For example, the second sealing member 29 is integrally formed into the second door portion 27c. The second sealing member 29 can be a rubber elastic member, such as an elastomer or rubber. As another example, the second sealing member 29 can be provided by an elastic sealing member (e.g., packing member) fixed to the second door portion such as by gluing, adhering or the like. The elastic sealing member is made of a rubber elastic material, such as an elastomer or rubber and has a rectangular loop shape.

In the present embodiment, the face door 24 and the foot door 27 serve as door members for switching air-blowing modes, such as a face mode, a bi-level mode, a foot mode, a defroster mode and the like. The face and foot doors 24, 27 are arranged such that the rotation shafts 24a, 27a extend in the vehicle right and left direction. The rotation shafts 24a, 27a are coupled to an air-blowing mode operation device through a link mechanism outside of the unit case 12 to be operated together. The air-blowing mode operation device is constructed of a manual operation device or an actuator device including a servomotor and the like.

Next, an operation of the air conditioning apparatus will be described. When an air-volume switch (not shown) of the air conditioning apparatus is operated and the motor of the blower 11 is supplied with electric power, the fan 11a is operated. As the fan 11a is operated, the outside air or the inside air is drawn into the inside/outside air switching device and is introduced into the space 12a of the unit case 12 in the downward direction as shown by the arrow a in FIG. 1.

The air is fully supplied toward the evaporator 13 in the vehicle rearward direction and is cooled while passing through the evaporator 13. Thus, the cooled air is generated. The cooled air is divided into the cooled air passage 16 and the heated air passage 19 in accordance with an opening degree of the air mix door 18. The cooled air passing through the cooled air passage 16 and the heated air, which has been heated by the heater core 15 while passing through the heated air passage 19, are merged together in the air mix space 20, which is provided downstream of the heater core 15. The ratio of the volume of the cooled air to the heated air, that is, an air mixing ratio is controlled in accordance with the adjustment of the opening degree of the air mix door 19. Thus, the conditioned air having a predetermined temperature is generated by the adjustment of the air mixing ratio.

The conditioned air is conducted toward at least one of the foot openings 26, the face opening 21 and the defroster opening 22 and is blown toward predetermined positions in the passenger compartment. Thus, an air conditioning operation of the passenger compartment and/or an anti-fog or defrosting operating of the windshield are performed. The air-blowing modes are switched by controlling the positions of the face door 24 and the foot door 27.

In the face mode, the conditioned air is introduced into the face duct from the face opening 21. In the bi-level mode, the conditioned air is introduced into the face duct and the foot duct 30 from the face opening 21 and the foot openings 26. In the foot mode, the conditioned air is mainly introduced into the foot ducts 30 from the foot openings 26 and the small amount of conditioned air is introduced into the defroster duct from the defroster opening 22. In the defroster mode, the conditioned air is introduced into the defroster duct from the defroster opening 22.

Next, an operation of the foot door 27 will be described. The foot door 27 is rotatable about the rotation shaft 27*a* such that the first door portions 27*b* move along the inner surfaces of the side walls 12*b*. As the foot door 27 moves in a clockwise direction in FIG. 1 to a position where the first door portions 27*b* and the second door portions 27*c* coincide with the side openings 26*a* and the openings of the communication portion 25, respectively, the foot openings 26 are fully closed.

That is, when the first door portions 27*b* are at the positions overlapping with the side openings 26*a*, the side openings 26*a* are fully closed. When the side openings 26*a* are fully closed by the first door portions 27*b*, the openings of the communication portion 25 are fully covered by the second door portions 27*c*. Thus, the openings of the communication portion 25 and the side openings 26*a* are simultaneously closed by the second door portions 27*c* and the first door portions 27*b*, respectively.

In a condition where the foot door 27 is in the fully close position, the conditioned air generated in the air mix space 20 passes through at least one of the face opening 21 and the defroster opening 22 through the face/defroster passage 23 and is introduced into the passenger compartment.

As the foot door 27 is moved in a counterclockwise direction in FIG. 1 from the fully close position, the first door portions 27*b* are displaced from the side openings 26*a*. That is, the opening degrees of the side openings 26*a* gradually increase. At the same time, the openings of the communication portion 25 are fully opened as the second door portions 27*c* are separated from the openings of the communication portion 25.

Further, when the foot door 27 is moved in the counterclockwise direction from the fully closed position by a predetermined amount, the foot door 27 is placed on the rear side of the foot openings 26 with respect to the vehicle front and rear direction. That is, the foot door 27 is in a position where the side openings 26*a* and the openings of the communication portion 25 are fully opened.

In a condition where the foot door 27 is in the fully close position, the conditioned air generated in the air mix space 20 passes through the side openings 26*a* and the openings of the communication portion 25. The conditioned air passing through the openings of the communication portion 25 is conducted to the passage openings 26*b* through the passage portion 17. The conditioned air passing through the side openings 26*a* and the passage openings 26*b* are introduced in the foot ducts 30 and is blown into the passenger compartment from the foot air-blowing outlets.

Since the communication portion 25 is formed in the passage wall 17*a* of the passage portion 17, which is disposed between the scroll casing 11*b* and the heater core 15, the conditioned air can be introduced in the foot ducts 30 from the passage openings 26*b* in addition to the air from the side openings 26*a*. Accordingly, the opening areas of the foot openings 26 are increased without increasing the overall size of the air conditioning apparatus.

The side openings 26*a* and the openings of the communication portion 25 are opened and closed by the single foot door 27. That is, it is not necessary to provide a door for each of the side openings 26*a* and the openings of the communication portion 25. Therefore, it is less likely that the overall size of the air conditioning apparatus will be increased.

The foot openings 26, which are formed on both side walls 12*b* of the unit case 12, are opened and closed by the single foot door 27. Therefore, it is less likely that the overall size of the air conditioning apparatus will be increased.

The foot openings 26 are located close to the heater core 15. Therefore, the conditioned air is blown from the foot air-blowing outlets through the foot ducts 30 while reducing heat loss of the conditioned air heated by the heater core 15.

Since the single foot duct 30 is coupled to the side opening 26*a* and the passage opening 26*b* on each side of the unit case 12, the increase in size of the air conditioning apparatus is restricted. Further, the foot duct 30 is extended from the foot opening 26 in the downward direction, the foot opening 26 and the foot air-blowing outlet are connected by a short distance through the foot duct 30. Thus, the increase in size of the air conditioning apparatus is restricted.

In a case where an end of a heater core is disposed adjacent to a fan casing, air inside of the fan casing will be affected by heat of the heater core. As a result, a cooling load of the evaporator will be increased, and heating performance of the heater core will be deteriorated. In the present embodiment, on the other hand, the tubular passage portion 17 is provided between the fan casing 11*b* and the end of the heater core 15, it is less likely that the air inside of the fan casing 11*b* will be affected by heat of the heater core 15. That is, heat exchange between the heater core 15 and the fan casing 11*b* is reduced. Also, since the air passing through the tubular passage portion 17 is blown into the passenger compartment through the passage openings 26*b*, air conditioning efficiency is improved.

Second Embodiment

Figure 4A:
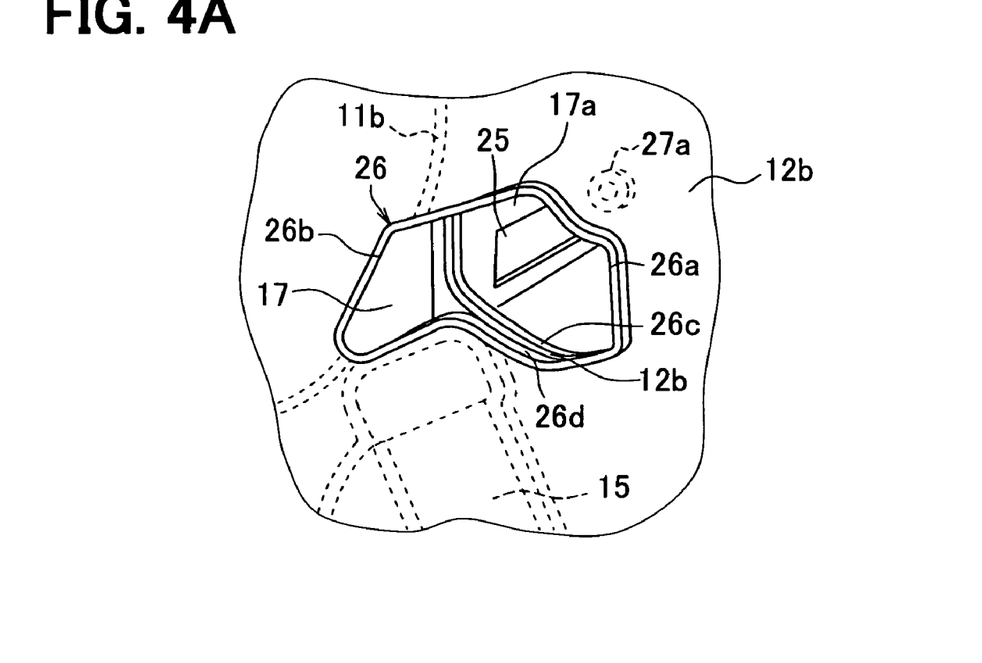
FIG. 4A is a schematic perspective view of a foot opening of an interior unit of an air conditioning apparatus according to a second embodiment of the present invention.
Figure 4B:
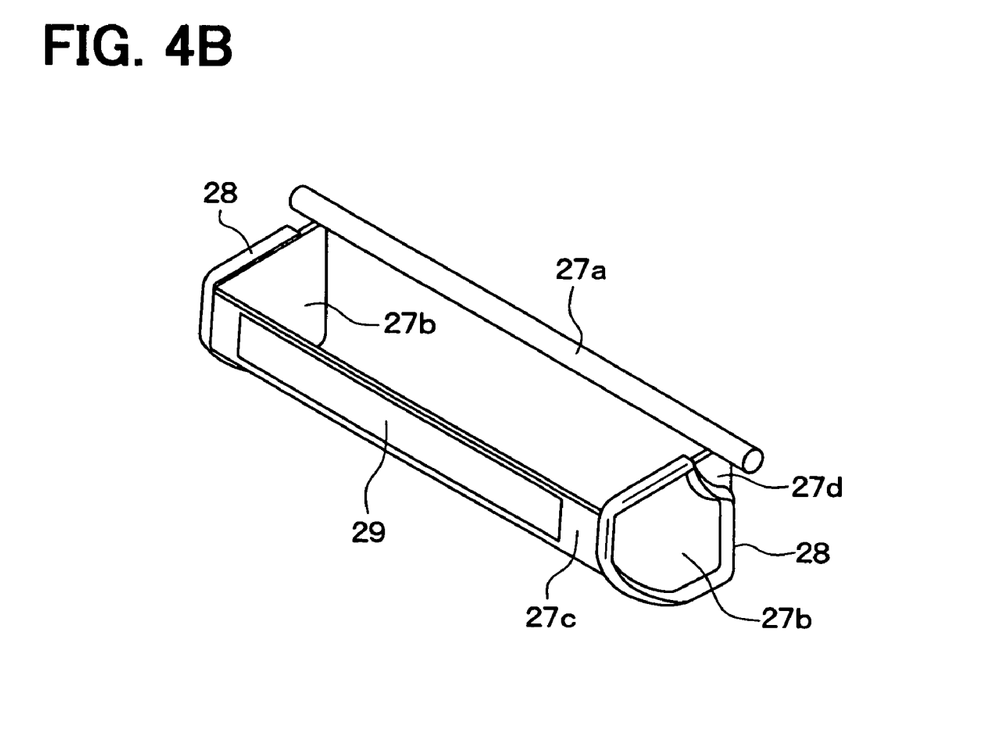
FIG. 4B is a perspective view of a foot door of the interior unit according to the second embodiment.

A second embodiment will now be described with reference to FIGS. 4A and 4B. Hereinafter, like components are denoted by like reference characters and a description thereof is not repeated.

In the first embodiment, the communication portion 25 is provided by two openings formed adjacent to opposite ends of the passage wall 17*a* with respect to the vehicle right and left direction. In the second embodiment, the communication portion 25 is provided by a single opening that has a rectangular shape extending in a longitudinal direction of the passage wall 17*a*, such as in the vehicle right and left direction, as shown in FIG. 4A. In this case, the foot door 27 has a single second door portion 27*c* for opening and closing the opening of the communication portion 25, as shown in FIG. 4B. The second door portion 27*c* has a rectangular shape and extends between the first door portions 27b. The second sealing member 29 has a shape corresponding to the opening of the communication portion 25.

In this case, the opening area of the communication portion 25 is increased, the volume of air flowing into the passage portion 17 increases. As a result, the volume of air passing through the foot openings 26 is increased.

Other Embodiments

In the above embodiments, the opening(s) of the communication portion 25 and the second door portion(s) 27c respectively have the rectangular shape having a length in the longitudinal direction of the rotation shaft 27a. However, the opening(s) of the communication portion 25 and the second door portion(s) 27c can have any other shapes.

The air conditioning apparatus can be implemented by combination of the above embodiments. For example, the foot door 27 of the second embodiment can be employed to open and close the openings of the communication portion 25 of the first embodiment. Also, the number of openings of the communication portion 25 is not limited to one or two.

Additional advantages and modifications will readily occur to those skilled in the art. The invention in its broader term is therefore not limited to the specific details, representative apparatus, and illustrative examples shown and described.

What is claimed is:

1. An air conditioning apparatus for a vehicle, comprising:
a blower, for suctioning air and blowing the air into a passenger compartment of the vehicle, the blower including a fan and a fan casing that houses the fan;
a unit case defining an air passage through which the air blown from the blower flows, the unit case having side walls opposed to each other with respect to a direction along an axis of rotation of the fan;
a cooling heat exchanger disposed in the unit case downstream of the blower with respect to a flow of the air in the unit case for cooling the air, the cooling heat exchanger having an end adjacent the fan casing;
a heating heat exchanger disposed in the unit case downstream of the cooling heat exchanger with respect to the flow of the air in the unit case for heating the air, the heating heat exchanger having an end located adjacent the fan casing and adjacent the end of the cooling heat exchanger, and a distance between the heating heat exchanger and the cooling heat exchanger increases as a function of a distance from the fan casing;
side openings provided in the side walls of the unit case at locations downstream of the heating heat exchanger with respect to the flow of the air for blowing out the air that flows downstream of the heating heat exchanger; and
a door disposed in the unit case for opening and closing the side openings by moving along the side walls;
a hollow tubular part provided in the unit case at a location between the end of the heating heat exchanger and the fan casing and extending in the direction along the axis of rotation of the fan, wherein
the tubular part includes a passage wall that opposes a space downstream of the heating heat exchanger,
the passage wall is provided with a communication portion for allowing communication between an inner space of the tubular part and the space downstream of the heating heat exchanger,
the unit case further has passage openings at locations corresponding to opposite ends of the tubular part with respect to the direction along the axis of rotation of the fan for blowing out air, which is introduced in the inner space of the tubular part through the communication portion,
the side openings are disposed adjacent to the passage openings,
the door includes a rotation shaft, first planar plate door portions and a second planar plate door portion, the rotation shaft extending in a direction perpendicular to the side walls, the first planar plate door portions being perpendicular to and integrally connected to the rotation shaft and configured to move along the side openings for opening and closing the side openings, the second planar plate door portion being perpendicular to and integral with the first planar plate door portions and parallel to the passage wall for opening and closing the communication portion; and
the door opens and closes the communication portion simultaneously with the side openings.

2. The air conditioning apparatus according to claim 1, further comprising:
ducts coupled to the side openings and the passage openings for conducting air passing through the side openings and the passage openings toward the passenger compartment of the vehicle.

3. The air conditioning apparatus according to claim 2, wherein
each of the side openings and each of the passage openings constitute a foot opening, and
each of the ducts is a foot duct and extends downwardly from the foot opening for conducting air passing through the foot opening toward a lower area of the passenger compartment.

4. The air conditioning apparatus according to claim 1, wherein
the communication portion defines plural openings, and
the second planar plate door portion includes plural planar plate portions disposed correspondingly to the plural openings.

5. The air conditioning apparatus according to claim 1, wherein
the fan casing and the tubular part are integral with the unit case.

* * * * *